(12) United States Patent
Diesterweg et al.

(10) Patent No.: US 12,420,306 B2
(45) Date of Patent: Sep. 23, 2025

(54) METHOD OF PAINTING A VEHICLE BRAKE COMPONENT USING A SEALING PLUG

(71) Applicant: ZF CV Systems Europe BV, Brussels (BE)

(72) Inventors: German Diesterweg, Viernheim (DE); Uwe Montag, Ketsch (DE); Bernward Redemann, Hockenheim (DE); Vitalij Scherer, Leimen (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 17/977,050

(22) Filed: Oct. 31, 2022

(65) Prior Publication Data

US 2023/0146765 A1    May 11, 2023

(30) Foreign Application Priority Data

Nov. 9, 2021    (EP) ..................................... 21207131

(51) Int. Cl.
*B05D 1/32* (2006.01)

(52) U.S. Cl.
CPC ...................................... *B05D 1/32* (2013.01)

(58) Field of Classification Search
None
See application file for complete search history.

(56) References Cited

U.S. PATENT DOCUMENTS

| | | | | |
|---|---|---|---|---|
| 3,675,742 A | * | 7/1972 | Thompson | F16D 55/228 92/164 |
| 5,702,774 A | * | 12/1997 | Griffin | B05B 12/20 427/127 |

(Continued)

FOREIGN PATENT DOCUMENTS

| | | |
|---|---|---|
| DE | 102008048127 A1 | 3/2010 |
| DE | 102017201298 A1 | 8/2018 |
| DE | 202018004768 U1 | 1/2020 |

(Continued)

OTHER PUBLICATIONS

Preparing High Performance Brake Installation : How to Mask Brake Calipers for Painting published by ExpertVillage Leaf Group, available at https://www.youtube.com/watch?v=sOiVCBmDjCw, Jan. 2008.*

(Continued)

*Primary Examiner* — Michael P. Rodriguez
(74) *Attorney, Agent, or Firm* — Dickinson Wright PLLC (57) ABSTRACT

A system and method for painting a component (3) of a vehicle brake (1) includes a sealing plug (7) inserted into a recess (5), the recess extending in the direction of a longitudinal axis (L) and which has an inner face (9) which is intended to be kept free from paint. The method includes providing the component (3) and introducing a sealing plug (7) into the recess (5) of the component. The sealing plug (7) has at least one sealing face (11a-11h) and the sealing face (11a-11h) is disposed inside the recess (5). The sealing face is moved into sealing abutment with the inner face (9) in a radial direction. The method includes painting the component (3) after the sealing plug (7) has been introduced. The sealing plug blocks paint from being deposited on the inner face.

20 Claims, 8 Drawing Sheets

(56) References Cited

U.S. PATENT DOCUMENTS

2011/0247551 A1* 10/2011 Malone ................ B05C 21/005
　　　　　　　　　　　　　　　　　　　　　　　　　　118/505
2017/0209915 A1　　7/2017 Iguma et al.

FOREIGN PATENT DOCUMENTS

DE　　102019004282 A1　9/2020
DE　　102020203860 A1　10/2020

OTHER PUBLICATIONS

Best Masking Plugs For Powder Coating; L. Lechner; available at https://www.echosupply.com/blog/best-masking-plugs-for-powder-coating/; Jul. 2020.*
Purchaser's Guide for Buying Industrial Masking Supplies; L. Lechner; available at https://www.echosupply.com/blog/purchasers-guide-for-buying-industrial-masking-supplies/; Jun. 2020.*
Why Masking is Necessary for Powder Coating and Which Masking Supplies to Use; powdercoatguide.com; available at https://www.powdercoatguide.com/2013/08/masking.html; published Aug. 2013.*
Masking Plugs; epsi.com; available at https://www.epsi.com/plugs; as published Jun. 2018.*
FLPE Series—EPDM Flangless Plugs; available at https://www.epsi.com/flpe-series-epdm-flangless-plugs as published Oct. 2020.*
FLPS Series—Silicone Flangless Plugs; available at https://www.epsi.com/flps-series-silicone-flangless-plugs as published Sep. 2020.*

* cited by examiner

METHOD OF PAINTING A VEHICLE BRAKE COMPONENT USING A SEALING PLUG

FIELD

The present disclosure relates to a method for painting a component of a vehicle brake, in particular for painting a component of a utility vehicle brake, wherein the component has a recess which extends in the direction of a longitudinal axis and which has an inner face which is intended to be kept free from paint. The present disclosure particularly relates to such cataphoretic dip coating methods but can also be used for other methods. The present disclosure particularly relates to the painting of brake calipers of utility vehicle brakes but can in principle also be used for all components which have recesses with inner faces which are intended to be kept free from paint.

BACKGROUND

Vehicle brakes, in particular utility vehicle brakes, are subjected to environmental influences during operation over their service-life and are thereby subjected to corrosion. In order to ensure adequate operational reliability, vehicle brakes, in particular utility vehicle brakes, generally have to demonstrate their corrosion resistance by way of test measures, such as, for example, salt water spray tests.

In order to improve the corrosion resistance of the components for vehicle brakes, vehicle brakes are coated with corrosion-inhibiting paints. A conventional method is, for example, so-called cathodic or cataphoretic dip coating (CDC) which is an electrochemical method in which paint particles are deposited on the component in an immersion bath under the influence of an electrical field.

The recesses which are intended to be kept fee from paint should, for example, contain no paint since they have to comply with tight dimensional tolerances, for instance, as guiding holes which would be impaired by painting. In the prior art, it has therefore been necessary either to again free the recesses from paint after a completed painting operation or to close the recesses from the outer side. This closing of the recesses from the outer side was carried out by operating devices, such as sealing disks, being fitted at the end side and being axially tensioned against the end face. A disadvantage of these attempts has been that the operational complexity was high and the sealing disks, which have been fitted from the outer side, have also always covered a portion of the end faces of the components so that after the painting method has been carried out, and the operating devices for closing the recess at the end face have been removed, unpainted locations that then do not have the required corrosion resistance were present.

SUMMARY

An object of the present disclosure is consequently to improve the corrosion resistance of components of a vehicle brake by providing an improved method for painting the components.

The present disclosure achieves the object by a method for painting a component of a utility vehicle brake, wherein the component has a recess which extends in the direction of a longitudinal axis and which has an inner face which is intended to be kept free from paint, the method including the steps of: preparing the component, introducing a sealing plug into the recess of the component, wherein the sealing plug has a sealing face and the sealing face inside the recess, with respect to the longitudinal axis, is moved into sealing abutment with the inner face in a radial direction, and painting the component after the sealing plug has been introduced.

The present disclosure follows the approach that the sealing plug performs its sealing function exclusively inside the recess in that it moves in a radial direction into sealing abutment with the inner face of the recess when it is introduced. According to the present disclosure there is in particular no sealing in an axial direction with respect to the end outer faces of the recess. As a result of this development of the sealing plug, and the concentration on a sealing in a radial direction against the inner face of the recess, so-called blind spots are prevented from remaining free during the painting on the outer face of the vehicle brake. Corrosion at such locations cannot subsequently occur, whereby the corrosion resistance of the components of the vehicle brake is significantly improved.

The method is accordingly advantageously developed in that the component has an end face in which the recess is introduced and the sealing plug is introduced into the recess in such a manner that, in the introduced state, the sealing plug is spaced apart with respect to the end face.

In another preferred embodiment, the end face described above is a first end face and the component further has a second end face, wherein the recess extends from the first end face to the second end face through the component, wherein the component is preferably a brake caliper, and the sealing plug is introduced into the recess in such a manner that, in the introduced state, the sealing plug is spaced apart with respect to the first end face and the second end face.

In another preferred embodiment, there is arranged inside the recess a sliding sleeve that has a sliding face that in turn forms a portion of the inner face of the recess. Generally, such sliding sleeves are pressed into the recesses. The method is in this regard advantageous with respect to the prior art since the pressing-in of the sliding sleeves can also already be carried out before the painting. The sealing plug reliably prevents paint from penetrating into the recess and being deposited in an undesirable manner on the sliding sleeve.

In a preferred development, the sealing plug is introduced in such a manner that, in the introduced state, it is preferably extensively in sealing abutment with at least one sealing face against the sliding face of the sliding sleeve.

If the sealing plug has a plurality of sealing faces, these are also referred to together as a sealing face arrangement.

In another preferred embodiment, the sealing face is a first sealing face and the sealing plug further has at least a second sealing face which is arranged in the longitudinal direction with spacing from the first sealing face on the sealing plug, wherein the sealing plug is introduced in such a manner that it is also brought with the second sealing face into sealing abutment with the inner face within the recess with respect to the longitudinal axis in a radial direction.

In a further preferred manner, the sliding sleeve is a first sliding sleeve and inside the recess there is further arranged a second sliding sleeve which has a second sliding face which forms a part of the inner face of the recess. Preferably, the sealing plug is then introduced in such a manner that, in the introduced state, it is preferably extensively in sealing abutment with the second sealing face against the second sliding face of the second sliding sleeve.

In other preferred embodiments, the recess has one or more additional sliding sleeves and the sealing plug is accordingly constructed so that it is also preferably completely in abutment with those sliding faces in the introduced state.

Alternatively or additionally to a sealing directly against the sliding faces of the sliding sleeves, a preferred embodiment of the method provides for the first and second sealing faces of the sealing plug to be spaced apart from each other in such a manner that they enclose the sliding sleeve or sliding sleeves between them.

Preferably, in the introduced state, at least one of the sealing faces is in sealing abutment with an end portion of the sliding sleeves in the direction of the longitudinal axis.

In another preferred embodiment, at least one of the sealing faces, in addition to the sliding sleeves, is in sealing abutment with the recess in an axially spaced-apart or adjacent manner.

In another preferred embodiment of the invention, the sealing plug has a base member made of a resiliently deformable material, preferably silicone, or a silicone-containing material. This material selection affords the advantage that the sealing plug has very good resilient deformation properties and additionally after use can be easily cleaned and prepared for reuse.

In a further preferred manner, the base member of the sealing plug is in the form of a hollow member with a longitudinal axis and is preferably open in the direction of the longitudinal axis thereof at one or both ends. The configuration as a hollow member facilitates the radial compression of the sealing plug and consequently the introduction thereof into the recess. An open sealing plug, in particular when it is open in both directions, improves the flow of the painting agent in an immersion method and contributes to preventing an undesirable spreading of painting agent and/or other fluids which are required for the painting process into subsequent processing steps, such as, for example, subsequent immersion baths. The (painting and/or other) agent can flow through the sealing plug, whilst the inner face of the recess which is intended to be kept free is protected by the sealing plug in an undiminished manner. Preferably, the sealing plug has around the recess a tapered portion, in a particularly preferred manner a conical tapered portion. The tapered portion makes an undesirable accumulation of fluid in the region of the recess more difficult and thus improves the drainage thereof.

In another preferred embodiment, the sealing plug is reinforced in the region of at least one of the ends thereof, wherein the sealing plug preferably has a material thickening and/or a support ring, and wherein, in the step of the introduction, the reinforced end is preferably also introduced into the recess. This improves the retention of the sealing plug inside the recess during the immersion operation or during the painting operation. As mentioned in the introduction, the invention particularly demonstrates its advantages during immersion painting methods, but the protective effect of the sealing plug is equally apparent in spray painting methods.

In another preferred embodiment, the method further comprises the steps of: removing the sealing plug after the painting step, cleaning the sealing plug of paint residues, and preparing the sealing plug for reuse in another run-through of the method.

The reuse of operating components, such as the sealing plug described herein, contributes to the sustainability of the production process and contributes to the environmental compatibility.

The present disclosure has been described above in a first aspect with reference to the method according to the present disclosure. In a second aspect, the present disclosure further relates to a sealing plug for use in the painting method in a component of a vehicle brake, in particular in a method according to one of the preferred embodiments described above, wherein the component has a recess which extends in the direction of a longitudinal axis and which has an inner face which is intended to be kept free from paint.

The present disclosure also solves the problem set out in the introduction with regard to such a sealing plug in that the sealing plug is configured to be introduced into the recess of the component and has at least one sealing face—or a sealing face arrangement having a plurality of sealing faces—with an excess dimension with respect to the inner face of the recess so that the sealing face inside the recess can be brought into sealing abutment with the inner face in a radial direction with respect to the longitudinal axis. The term "excess dimension" is intended to be understood in this instance to mean that the sealing plug is pressed together in a radial direction and/or the material thereof is compressed when it is introduced into the recess, in any case in those regions of the base member thereof in which the sealing face or sealing faces is/are formed The sealing plug according to the present disclosure makes use of the same advantages as the method according to the invention. The preferred embodiments of the method are at the same time preferred embodiments of the sealing plug according to the present disclosure, and vice versa, for which reason in order to prevent repetition, reference may be made to the above statements.

The present disclosure relates in another aspect to the use of a sealing plug for keeping an inner face of a recess of a component of a vehicle brake free from paint during a painting operation. The use of the sealing plug achieves the object described in the introduction by a sealing plug, which is constructed in accordance with one of the preferred embodiments described above, being used.

The use of the sealing plug exploits the same advantages as the method according to the invention and the sealing plug according to the invention. The preferred embodiments of the method and the sealing plug are at the same time preferred embodiments of the use of the sealing plug according to the present disclosure, and vice versa, for which reason in order to prevent repetition reference may be made to the above statements.

BRIEF DESCRIPTION OF THE DRAWINGS

The invention is described in greater detail below with reference to the appended Figures and preferred embodiments. In the drawings.

DETAILED DESCRIPTION

Figure 1:
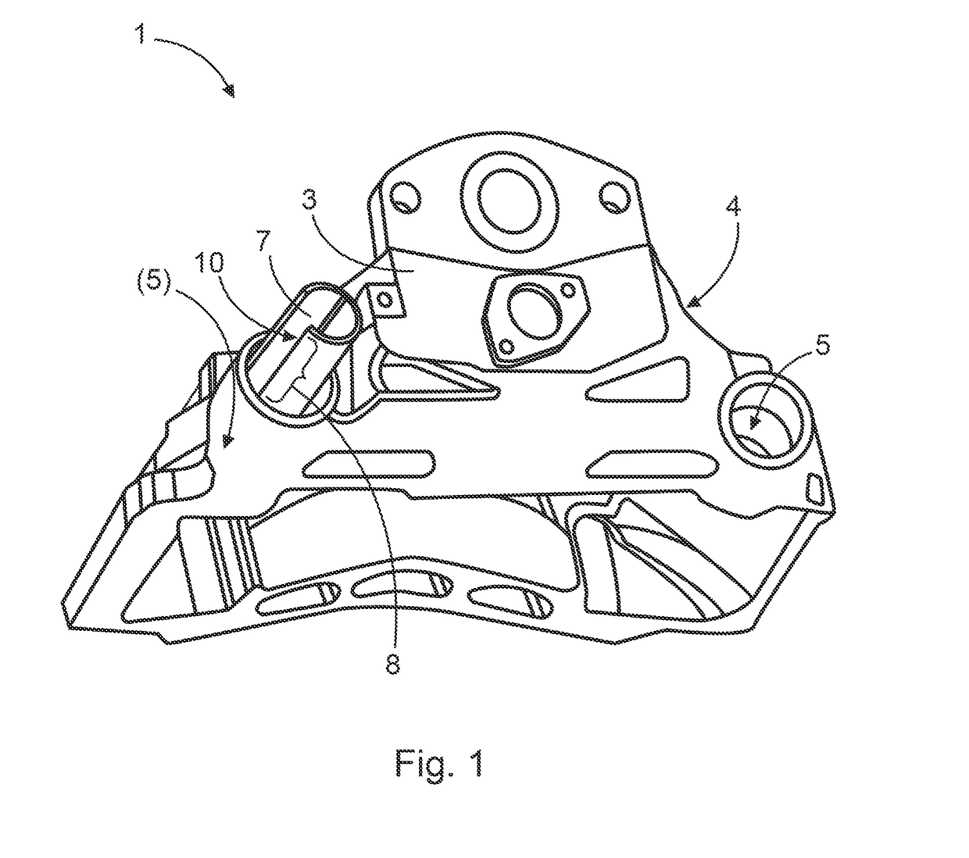
FIG. 1 is a perspective view of a component of a vehicle brake, in a state prepared for painting in the method according to the present disclosure.

FIG. 1 shows, as a portion of a utility vehicle 1, a component 3 of a brake system of the utility vehicle. 1, in particular, a brake caliper. In the present embodiment, the component 3 is produced as a cast component but could also be a component produced in a different manner. The component 3 has a base member 4 in which a plurality of recesses 5 are introduced. The recesses 5 are, for example, configured as bolt guides for receiving and linearly guiding bolts for brake liner adjustment. In the left portion of the component 3 in FIG. 1, a sealing plug 7 is shown introduced into one of the recesses 5. A handling portion 8 protrudes from the recess 5. There are introduced in the handling portion 8 one or more, in this instance two, opposing recesses 10, by way of which the handling portion 8 can be pressed together in order to facilitate an introduction and removal of the sealing plug 7 into the recess 5 or out of the recess 5.

The sealing plug 7 is retained by way of a clamping force in a radial direction in a substantially frictionally engaging manner in the recess 5. This will be discussed in greater detail below with reference to a number of different embodiments in the following Figures.

FIGS. 2-7 show various embodiments of the sealing plug 7, which correspond to each other in terms of significant basic principles. All the sealing plugs thus have a substantially cylindrical basic shape and may be produced from a silicone-containing material, in particular silicone. The sealing plugs 7 in each case have a sealing face arrangement 11 which can be composed differently in the different variants. However, the sealing face arrangements 11 have in common that, as a result of a slight excess dimension of the sealing plug 7, they are in sealing abutment in a radial direction against an inner face 9 of the recess 5 and, in a radial direction relative to a longitudinal axis L, apply a clamping force that retains the sealing plug 7 in the recess in a frictionally engaging manner.

The recess 5 extends for all embodiments from a first end face 19 to a second end face 21 through the component 3, and the sealing plugs 7 are introduced into the recess 5 in such a manner that the sealing plugs 7, at both end faces 19, 21, are not in abutment with the end faces 19, 21, but instead are spaced apart therefrom.

The sealing plugs 7a-7e according to FIGS. 2 to 6 in each case have a hollow-cylindrical base member 25 which has, at least at one end, a through-opening 17 or at least one radial recess 29 for discharging painting agents, in particular in order to prevent undesirable spreading of painting agents and/or other fluids required for the painting process into subsequent processing steps.

The sealing plugs 7a-7e according to FIGS. 2-6 have, at the end opposite the handling portion 8, a reinforcement in the form of a material thickening 27. At the side of the handling portion, one or more engagement elements, for example flaps, which facilitate the withdrawal of the sealing plug after painting, are preferably provided. Preferably, the sealing plug has, in the region of the handling portion, one or more flaps that are configured to facilitate the withdrawal of the sealing plug after painting.

By way of example in all embodiments, at least one sliding sleeve, that is to say, in one aspect, a first sliding sleeve 13a and a second sliding sleeve 13b, is inserted in the recess 5, in particular pressed in. The sliding sleeves 13a, 13b in each case have a sliding face 15 which forms part of the inner face 9 of the recess 5.

The structural differences and different operating methods of the different sealing plugs 7a-7f will be discussed below.

Figure 2:
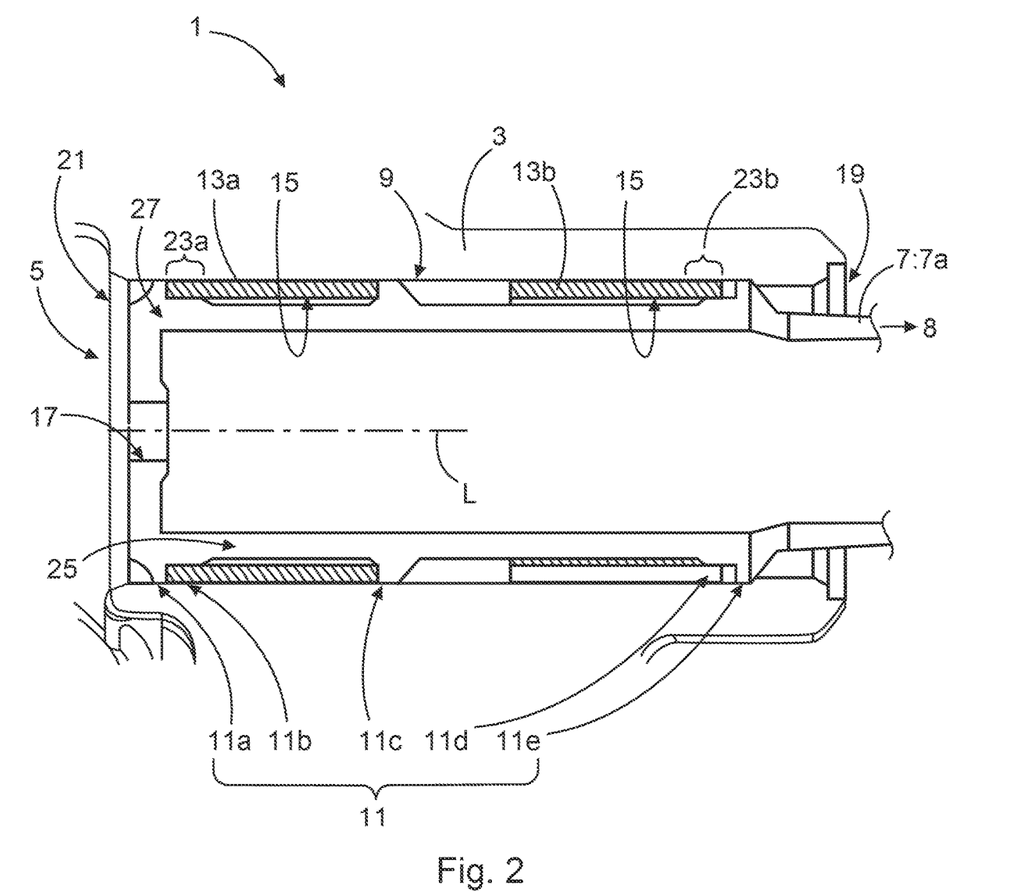
FIG. 2 is cross-sectional view of an embodiment of a sealing plug according to the present disclosure for use in the method according to the present disclosure.

The sealing plug 7a according to FIG. 2 has a plurality of sealing faces 11a-11e that are configured to seal the recess 5. The sealing plug 7a thus has a total of three sealing faces 11a, 11c, 11e which are in direct sealing abutment with the inner face 9 of the recess 5, wherein the sealing faces 11a, 11e are in each case, in addition to the sliding sleeves 13a, 13b, in abutment with the inner face 9 of the recess 5 and enclose the sliding sleeves 13a, 13b axially between them. The sealing face 11a is directly adjacently in abutment with the sliding sleeve 13a, whilst the sealing face 11e, which is arranged at an opposite end from sealing face 11a, is arranged with axial spacing from the sliding sleeve 13b. However, a different configuration is also completely conceivable, as will be seen from the other embodiments. Between the sealing faces 11a and 11b, and between 11d and 11e, there is preferably arranged at least one support face which is in particular orientated perpendicularly to the sealing faces and which is supported on the sliding sleeve and which positions the sealing plug inside the recess 5.

The sliding sleeve 13a is further located in sealing abutment with a sealing face 11b, in an end portion 23a of the sliding sleeve 13a. A sealing face 11d of the sealing face arrangement 11 is also located in an end portion 23b of the sliding sleeve 13b in sealing abutment with the sliding sleeve 13b.

Between the sealing faces 11b, 11d there is arranged another sealing face 11c which also brings about an individual closure of the sliding sleeves 13a, 13b in respective cavities, on the one hand, with the sealing face 11a and, on the other hand, with the sealing face 11e.

Figure 3:
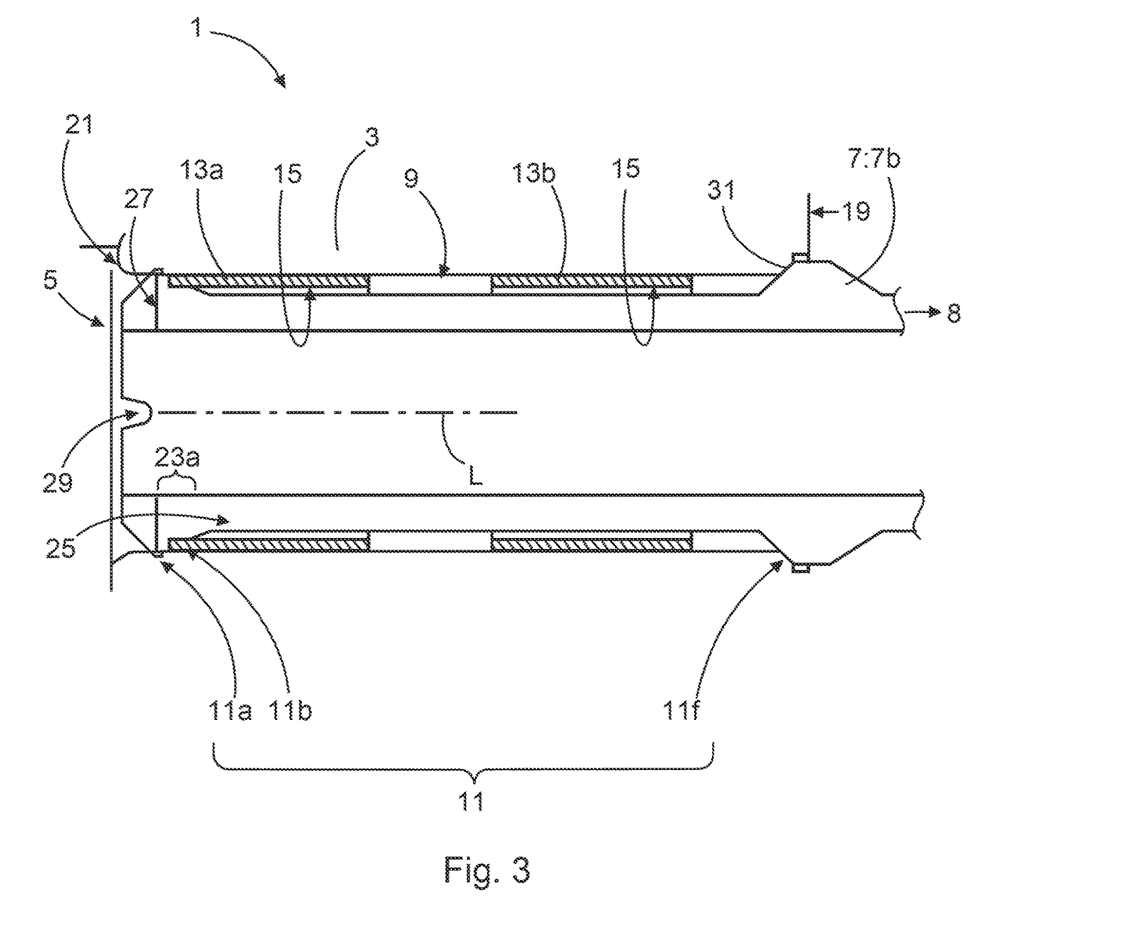
FIG. 3 is cross-sectional view of another embodiment of a sealing plug according to the present disclosure for use in the method according to the present disclosure.

The sealing plug 7b according to FIG. 3 differs from the sealing plug according to FIG. 2 in that the sealing face arrangement 11 has a slightly smaller number of sealing faces. The sliding sleeves 13a, 13b are also enclosed by two terminal sealing faces 11a, 11f, wherein the sealing face 11a is constructed and arranged as in FIG. 2 while, however, the sealing face 11f is in sealing abutment with a chamfer 31 in the recess 5. As can be further seen in FIG. 3, the chamfer is slightly recessed relative to the end face 19 of the component 3 so that, in this embodiment, the sealing plug and in particular the sealing faces 11a-11f are spaced apart from both end faces 19, 21. The hollow-cylindrical base member 25 according to FIG. 3 is constructed to be continuously uniform at the inner side thereof, but has at the left end portion in FIG. 3 a radial recess 29 for discharging painting agent.

Adjacent to the sealing face 11a, the sealing plug 7b has an additional sealing face 11b which is in sealing abutment with the sliding sleeve 13a in an end portion 23a, as already described in FIG. 2.

Figure 4:
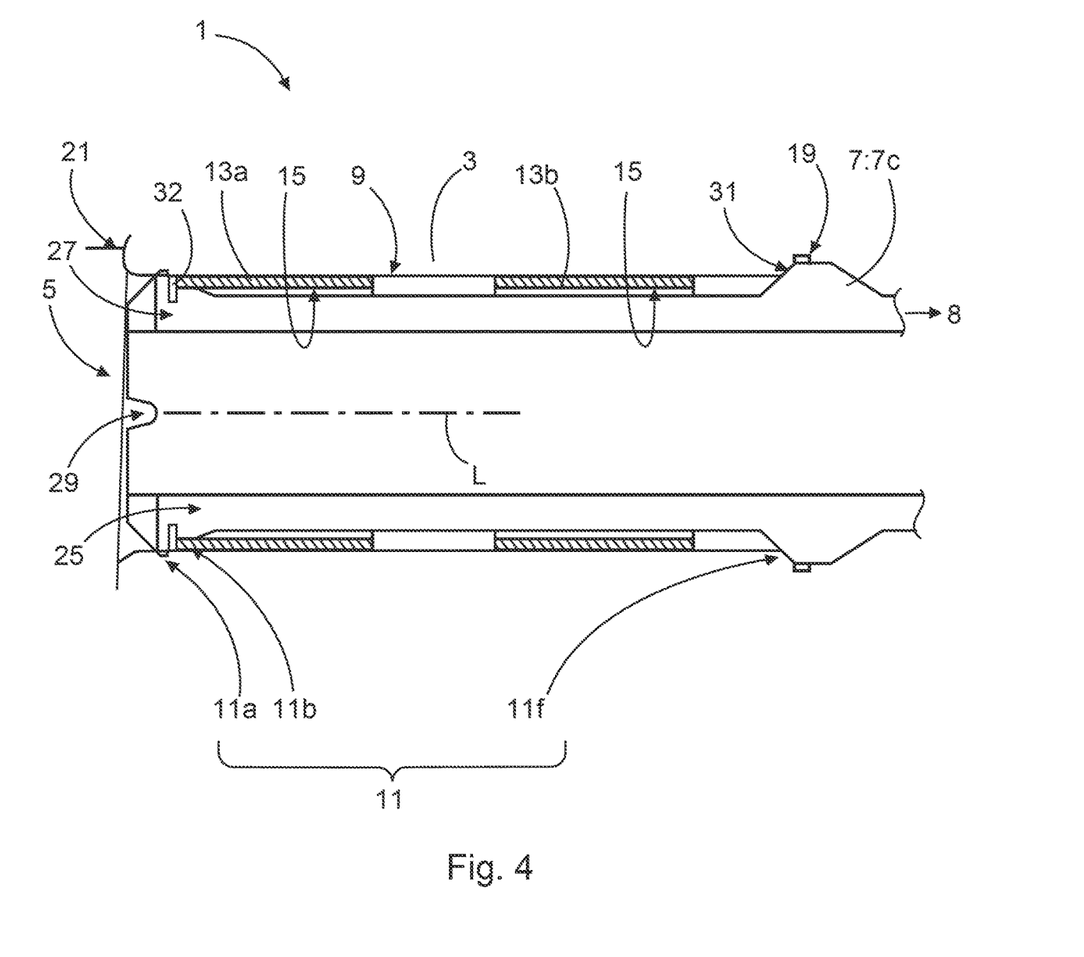
FIG. 4 is cross-sectional view of another embodiment of a sealing plug according to the present disclosure for use in the method according to the present disclosure.

The sealing plug 7c shown in FIG. 4 is constructed, with regard to the arrangement of the sealing faces 11a-11f thereof, in accordance with the sealing plug 7b according to FIG. 3, for which reason, with respect to identical reference numerals and in order to prevent repetition, reference may be made to the statements above. In contrast to the sealing plug 7b of FIG. 3, the sealing plug 7c has at the left end thereof in FIG. 4, that is to say, the end opposite the handling portion 8, a support ring 32 for additional reinforcement. The support ring 32, preferably in addition or as an alternative to the material thickening 27, stabilizes the base member 25 and increases the radial clamping action within the recess 5.

The sealing plugs 7a to 7c protect, in each case, at both sides of the recess 5 from paint being introduced up to the sliding sleeves 13a, 13b.

Figure 5:
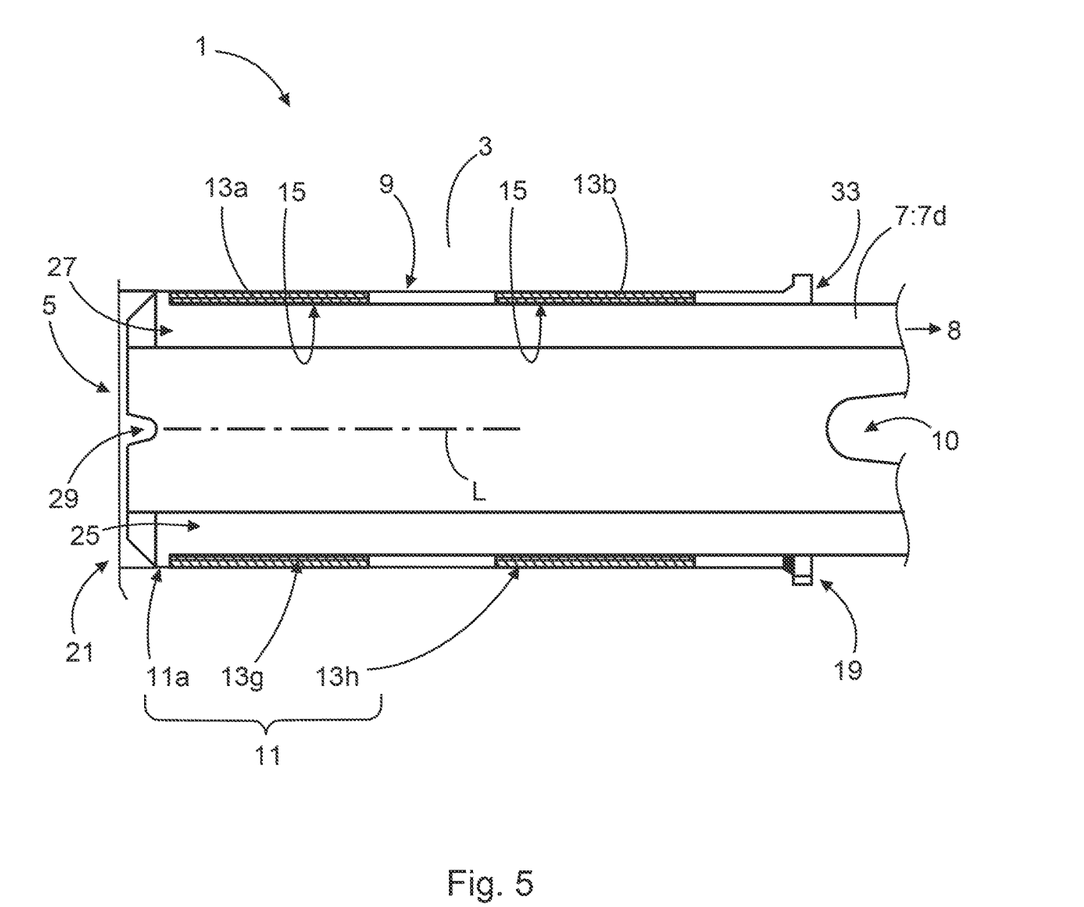
FIG. 5 is cross-sectional view of another embodiment of a sealing plug according to the present disclosure for use in the method according to the present disclosure.

As a variant to these embodiments, which are particularly suitable for complete immersion of the component 3 in a paint bath, or for painting the component 3 at all sides using other methods, FIG. 5 sets out a sealing plug 7d which is also suitable for such methods in which the entire component 3 is intended to be painted.

The sealing plug 7d has a sealing face arrangement 11 which is formed at the side of the sealing plug 7d opposite the handling portion 8 and at that location has a sealing face 11a and two additional sealing faces 11g, 11h. The sealing face 11a is used for additional sealing, as a sliding prevention mechanism, and/or for centering. The sealing face arrangement 11 further has the sealing faces 11g, 11h by which the sealing plug 7d primarily and directly seals against the sliding faces 15 of the sliding sleeves.

From the right side, an open gap 33 remains in the recess 5 after the sealing plug 7d has been introduced so that material could theoretically penetrate at that location, but not as far as the sliding faces 15 of the sliding sleeves. The sealing plug 7d is also spaced apart at both end sides 19, 21, even when it is completely introduced.

Figure 6:
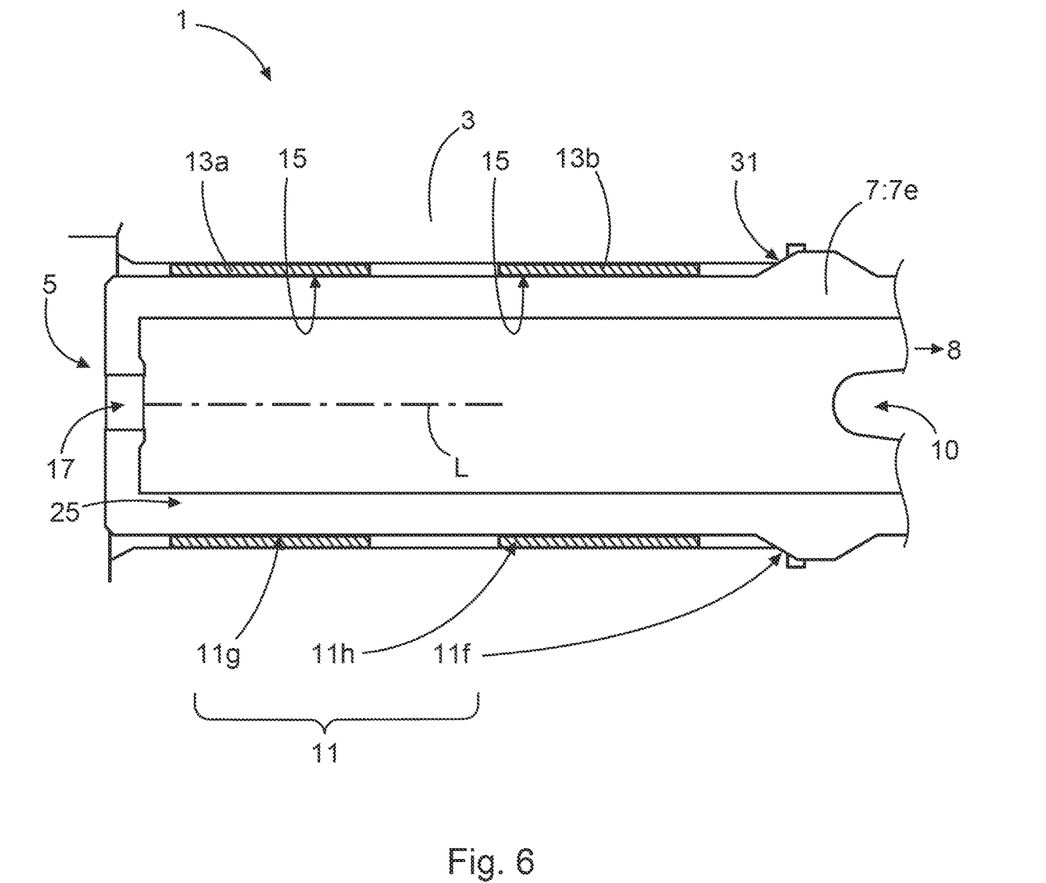
FIG. 6 is cross-sectional view of another embodiment of a sealing plug according to the present disclosure for use in the method according to the present disclosure.

The sealing plug 7e shown in FIG. 6 differs from the previous embodiments of FIGS. 1 to 4 in that the base member 25 of the sealing plug 7e is not only in abutment with sliding sleeves 13a, 13b in an end region, but the sealing face arrangement 11, as in FIG. 5, in each case has sealing faces 11g, 11h which, preferably over the entire length of the sliding sleeves 13a, 13b, that is to say, extensively, are in sealing abutment with the sliding faces 15 of the sliding sleeves and in this manner prevent an undesirable coating of the sliding faces 15 of the sliding sleeves within the recess 5. At the side of the sealing plug 7e facing the handling portion 8, the sealing face arrangement 11 has, in contrast to FIG. 5, in turn a conical sealing face 11f which seals the chamfer 31. As in FIG. 2, the sealing plug 7e has, at the end thereof opposite the handling portion 8, a through-opening 17.

Figure 7:
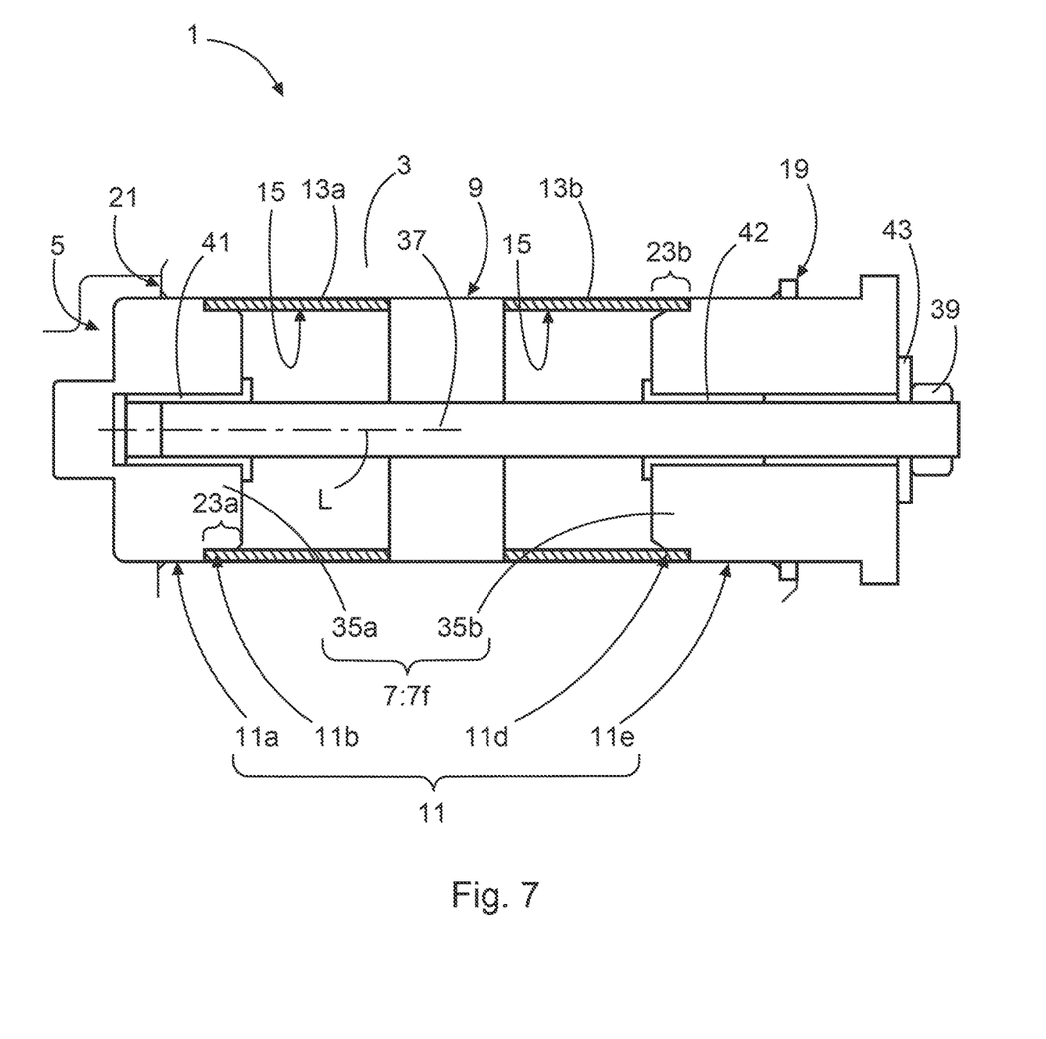
FIG. 7 is cross-sectional view of another embodiment of a sealing plug according to the present disclosure for use in the method according to the present disclosure.

Whilst in FIGS. 2 to 6 a single-piece sealing plug 7b-7e is shown, FIG. 7 sets out a sealing plug 7f which is formed from a first plug portion 35a and a second plug portion 35b. The plug portions 35a, 35b are operationally connected to each other by a clamping member, for example, by a spindle 37 and a clamping nut 39, which is supported against a disk 43, and can produce a clamping force using the clamping member. The clamping movement is transmitted via sleeves 41, 42 which are in each case formed in the plug portions 35a, 35b. The clamping of the sealing plug 7f within the recess 5 results in the plug portions 35a, 35b, which are produced from a resiliently deformable material, in particular a silicone-containing material or silicone, being moved against the sliding sleeves 13a, 13b and, when an adequate clamping resistance is reached, being compressed in an axial direction. The axial compression movement leads to the material giving way in a radial direction, whereby the radial sealing and clamping force according to the invention is then produced within the recess 5. The sealing plug 7f according to FIG. 7 is also spaced apart from both end faces 19, 21 and is not in abutment therewith. The component 3 can thus also be completely painted from the outer side with the sealing plug 7f according to FIG. 7, whilst the recess 5 or the inner face 9 thereof, including the sliding faces 15 of the sliding sleeves 13a, 13b can be kept completely free from paint.

Figure 8:
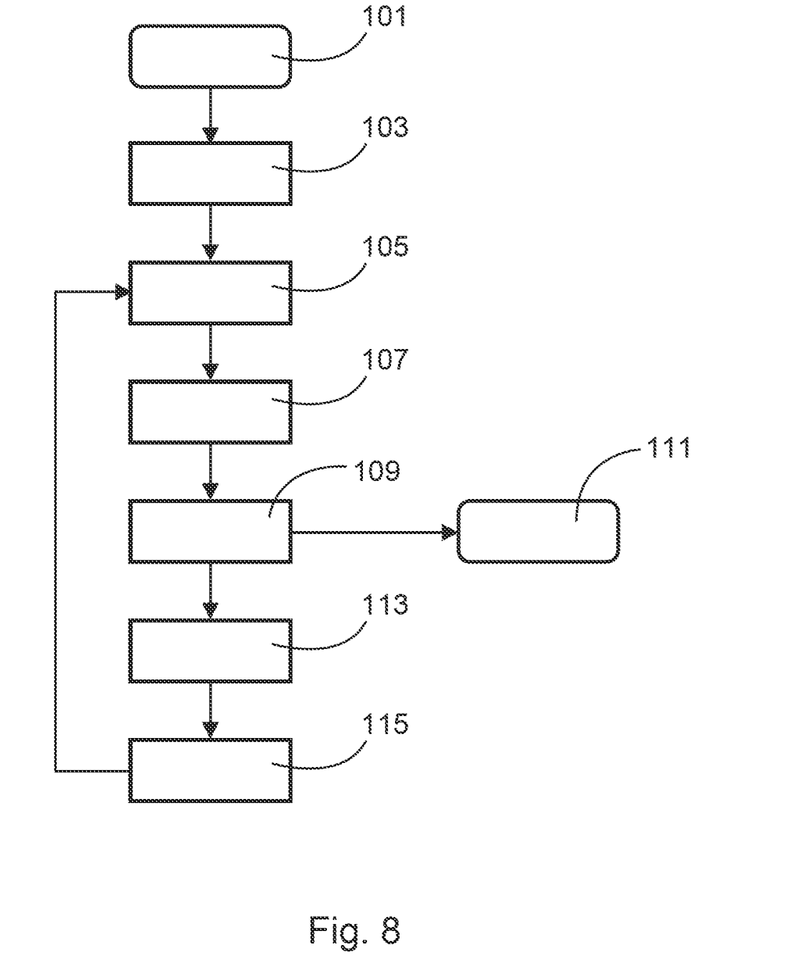
FIG. 8 is a schematic flow chart of an embodiment of the method of the present disclosure.

With reference to the method diagram according to FIG. 8, the use of the sealing plugs 7 according to FIGS. 1 to 7 in the method according to the present disclosure will now be explained.

A first step 101 represents the beginning of the method. At the beginning of the method, in step 103, a component of a vehicle brake, in particular a brake caliper for a utility vehicle brake, and a sealing plug 7, for example, one of the sealing plugs 7a-7f, is provided.

In a next method step 105, the sealing plug 7 is introduced into a recess 5 of the component 3, wherein the component 3 has an inner face 9 which is intended to be kept free from paint. The sealing plug 7 is introduced in such a manner that the sealing face arrangement 11 thereof, which has at least one sealing face 11a-11h, is in sealing abutment inside the recess 5 in a radial direction against the inner face 9 and thus closes the recess 5 in a paint-tight manner. In a next step 107, the component 3 is then painted. During the painting, the sealing plug 7 is retained in a frictionally engaging manner by the clamping force of the resiliently deformed material in the recess 5.

After the painting, in step 109, the sealing plug 7 is removed from the recess 5, for example, by the sealing plug 7 being pressed together at the handling portion 8 thereof, whereby the base member 25 of the sealing plug 7 at least partially collapses and can be pulled out of the recess 5. If a sealing plug 7f according to FIG. 7 is used, the radial clamping can be removed by releasing the clamping member 37, 39 until removal is possible.

After the sealing plug 7 has been removed from the component 3, the component can be transferred onward in the production sequence and the method can be ended in a step 111.

For the sealing plug 7, however, the method does not yet have to be ended at this point: in a next method step 113, the sealing plug 7 is preferably cleaned of paint residues so that in a subsequent method step 115 the sealing plug 7, which has been prepared in this manner, can be provided again for a method run-through and can be supplied again to the method step 105.

As long as the sealing plug 7 remains undamaged and the resilient deformability thereof is maintained to a sufficient degree, the sealing plug 7 can be used many times in the method according to the present disclosure.

LIST OF REFERENCE NUMERALS (PART OF THE DESCRIPTION)

1 Vehicle
2 Component
3 Base member
4 Recess, component
7: 7a-7f Sealing plug
8 Handling portion
9 Inner face
10 Recess, handling portion
11 Sealing face arrangement
11a-11h Sealing face
13a, 13b Sliding sleeve
15 Sliding face
17 Through-opening, sealing plug
19 End face, component
21 End face, component 23: 23a, 23b End portion, sliding sleeve
25 Base member, sealing plug
27 Thickened portion
29 Radial recess, sealing plug
31 Chamfer, component
32 Support ring
33 Gap, component
35a, 35b Plug portion
37 Spindle
39 Clamping nut
41 Sleeve, sealing plug
42 Sleeve, sealing plug
43 Disk
101, 103, 105, 107, 109, 111, 113, 115 Method steps
L Longitudinal axis

The invention claimed is:

1. A method for painting a component (3) of a vehicle brake (1), wherein the component (3) includes a recess (5) that extends in a direction of a longitudinal axis (L), the recess having an inner face (9) intended to be kept at least partially free from paint, the method comprising the steps of:
providing the component (3),
introducing a sealing plug (7) into the recess (5) of the component, wherein the sealing plug (7) has at least one sealing face and
disposing the sealing face inside the recess (5),
moving the sealing face into sealing abutment with the inner face (9) in a radial direction relative to the longitudinal axis (L), and
painting the component (3) after the sealing plug (7) has been introduced into the recess (5);
wherein the sealing plug (7) has a base member made of a resiliently deformable material;
wherein the sealing plug includes a plurality of radial flange members that extend radially from the base member into contact with the inner face of the recess;
wherein the radial flange members are axially spaced from each other;
wherein the component (3) has an end face from which the recess (5) extends;
wherein axially outermost ones of the radial flange members are disposed at axially recessed locations relative to the end face;
wherein a majority of the axial length between the axial outermost ones of the radial flange members is free from radially extending flange members, wherein each of the radial flange members are axially spaced relative to each other at an axial length that is greater than a radial protrusion of the flange member.

2. The method as claimed in claim 1,
wherein the sealing plug (7) is introduced into the recess (5) such that, in an introduced state of the sealing plug (7), the sealing plug (7) is spaced apart from the end face.

3. The method as claimed in claim 2,
wherein the end face is a first end face and the component (3) further has a second end face, wherein the recess (5) extends from the first end face to the second end face through the component (3), and
wherein the sealing plug (7) is introduced into the recess (5) such that, in the introduced state, the sealing plug (7) is spaced apart from both the first end face and the second end face such that either end face can be completely painted and the paint can extend partially into the recess and up to the end of the sealing plug.

4. The method as claimed in claim 1,
wherein a sliding sleeve is arranged inside the recess (5), wherein the sliding sleeve has a sliding face that forms a portion of the inner face (9) of the recess (5).

5. The method as claimed in claim 4,
wherein the sealing plug (7) is introduced such that, in the introduced state, at least one sealing face of the sealing plug (7) is in sealing abutment against the sliding face.

6. The method as claimed in claim 4,
wherein the sealing face is a first sealing face and the sealing plug (7) further has at least a second sealing face that is longitudinally spaced from the first sealing face on the sealing plug (7), and
wherein the sealing plug (7) is introduced such that the sealing plug (7) is also brought with the second sealing face into sealing abutment with the inner face (9) within the recess (5) in a radial direction relative to the longitudinal axis (L).

7. The method as claimed in claim 6,
wherein the sliding sleeve is a first sliding sleeve and a second sliding sleeve is further arranged inside the recess, the second sliding sleeve having a second sliding face that forms a part of the inner face (9) of the recess (5).

8. The method as claimed in claim 7,
wherein the sealing plug (7) is introduced such that, in the introduced state, the second sealing face of the sealing plug (7) is in sealing abutment against the second sliding face.

9. The method as claimed in claim 6,
wherein the first and second sealing faces of the sealing plug (7) are spaced apart from each other such that the first and second sealing faces enclose the sliding sleeve between them.

10. The method as claimed in claim 4,
wherein, in the introduced state, at least one of the at least one sealing faces is in sealing abutment with an end portion of the sliding sleeves.

11. The method as claimed in claim 4,
wherein, in the introduced state, at least one of the at least one sealing faces, in addition to the sliding sleeves, is in sealing abutment with the recess in an axially spaced-apart or adjacent manner.

12. A method for painting a component (3) of a vehicle brake (1), wherein the component (3) includes a recess (5) that extends in a direction of a longitudinal axis (L), the recess having an inner face (9) intended to be kept at least partially free from paint, the method comprising the steps of:
providing the component (3),
introducing a sealing plug (7) into the recess (5) of the component, wherein the sealing plug (7) has at least one sealing face and
disposing the sealing face inside the recess (5),
moving the sealing face into sealing abutment with the inner face (9) in a radial direction relative to the longitudinal axis (L), and
painting the component (3) after the sealing plug (7) has been introduced into the recess (5);
wherein the sealing plug (7) has a base member made of a resiliently deformable material;
wherein the base member is in the form of a hollow member with a longitudinal axis (L) and is open at one or both ends;
wherein the sealing plug includes a plurality of radially extending flange members, wherein each of the radially extending flange members are axially spaced relative to each other at an axial length that is greater than a radial protrusion of the flange member, wherein a majority of the axial length of the sealing plug is free from radially extending flange members.

13. The method as claimed in claim 1, wherein the sealing plug (7) is reinforced in the region of at least one of the ends thereof, wherein the sealing plug (7) has a material thickening and/or a support ring to define a reinforced end, and wherein, in the step of the introduction, the reinforced end is also introduced into the recess (5).

14. The method as claimed in claim 1, comprising the steps of:
removing the sealing plug (7) after the painting step, cleaning the sealing plug (7) of paint residues, and preparing the sealing plug (7) for reuse in another run-through of the method.

15. The method as claimed in claim 1, wherein use of the sealing plug (7) keeps the inner face (9) of the recess (5) of the component (3) free from paint during a painting operation.

16. The method as claimed in claim 1, wherein the recess extends between opposite ends faces of the component, and wherein, in the introduced state, opposite ends of the sealing plug are spaced longitudinally inwardly relative to the opposite end faces such that use of the sealing plug permits the end faces to be fully painted when completely immersed in liquid paint.

17. The method of claim 1, wherein the step of painting the component includes immersing at least a portion of the component in liquid paint, wherein the sealing plug fluidically seals and blocks the liquid paint from entering the recess past the sealing face.

18. The method of claim 1, wherein the component has a first end face and a second end face, wherein the recess (5) extends from the first end face to the second end face through the component (3), wherein the step of painting the component includes painting the second end face while the sealing plug is in the recess, wherein the sealing plug blocks liquid paint from passing through the recess and reaching the first end face.

19. A method for painting a component (3) of a vehicle brake (1), wherein the component (3) includes a recess (5) that extends in a direction of a longitudinal axis (L), the recess having an inner face (9) intended to be kept at least partially free from paint, the method comprising the steps of:
providing the component (3),
introducing a sealing plug (7) into the recess (5) of the component, wherein the sealing plug (7) has at least one sealing face and
disposing the sealing face inside the recess (5),
moving the sealing face into sealing abutment with the inner face (9) in a radial direction relative to the longitudinal axis (L), and
painting the component (3) after the sealing plug (7) has been introduced into the recess (5);
wherein a sliding sleeve is arranged inside the recess (5),
wherein the sliding sleeve has a sliding face that forms a portion of the inner face (9) of the recess (5);
wherein the sealing plug has a cylindrical shape including radially extending flange portions, wherein the radially extending flange portions contact a cylindrical inner surface of the recess, wherein the sliding sleeve has a cylindrical shape including annular end surfaces, wherein the radially extending flange portions of the sealing plug axially overlap the annular end faces and axially enclose the sliding sleeve;
wherein each of the radially extending flange members are axially spaced relative to each other at an axial length that is greater than a radial protrusion of the flange member.

20. The method of claim 1, wherein the base member is in the form of a hollow member with a longitudinal axis (L) and is open at one or both ends.

* * * * *